US009642495B2

United States Patent
Venot et al.

(10) Patent No.: US 9,642,495 B2
(45) Date of Patent: May 9, 2017

(54) WHISK

(71) Applicant: MASTRAD, S.A., Paris (FR)

(72) Inventors: Marc Venot, Saint Ouen (FR); Mathieu Lion, Paris (FR)

(73) Assignee: MASTRAD, S.A., Paris (FR)

(*) Notice: Subject to any disclaimer, the term of this patent is extended or adjusted under 35 U.S.C. 154(b) by 1 day.

(21) Appl. No.: 14/286,751

(22) Filed: May 23, 2014

(65) Prior Publication Data
US 2015/0335203 A1 Nov. 26, 2015

(51) Int. Cl.
A47J 43/10 (2006.01)

(52) U.S. Cl.
CPC .................. A47J 43/1093 (2013.01)

(58) Field of Classification Search
CPC .................................................. A47J 43/1093
USPC ................. 416/70 R, 72; 366/129, 308, 343
See application file for complete search history.

(56) References Cited

U.S. PATENT DOCUMENTS

| 785,114 | A | * | 3/1905 | Munn .............................. 416/76 |
| 938,369 | A | | 10/1909 | Christin |
| 955,672 | A | * | 4/1910 | Nielsen ......................... 366/343 |
| 1,176,409 | A | | 3/1916 | Stump |
| 1,250,889 | A | * | 12/1917 | Johnson ................ A47J 43/105 15/26 |
| 1,268,586 | A | * | 6/1918 | Lawton ........................... 416/75 |
| 1,417,982 | A | | 5/1922 | Fitzpatrick |
| 1,707,789 | A | * | 4/1929 | Fitzpatrick .......... A47J 43/1068 366/129 |
| 1,960,089 | A | * | 5/1934 | Rabb ............................ 74/89.45 |
| 1,966,352 | A | * | 7/1934 | Mahony ......................... 416/75 |
| 2,092,353 | A | * | 9/1937 | Kyseth et al. .................. 416/72 |
| 2,093,586 | A | * | 9/1937 | Day .............................. 425/456 |
| 2,452,923 | A | | 11/1948 | Graff |
| 2,454,350 | A | * | 11/1948 | Shores .......................... 416/76 |
| 2,575,978 | A | * | 11/1951 | Scheidecker ........... A47J 19/04 241/169.1 |
| 2,670,938 | A | * | 3/1954 | Wittmann ..................... 366/343 |
| 3,132,850 | A | * | 5/1964 | Puchalski .................... 366/308 |
| 3,154,297 | A | * | 10/1964 | Lovgren .................. 416/227 R |
| 4,309,823 | A | * | 1/1982 | Antolino et al. ............... 30/276 |
| 4,810,217 | A | * | 3/1989 | Bell .............................. 440/13 |
| 5,590,962 | A | * | 1/1997 | Millan et al. ................ 366/248 |
| 7,044,937 | B1 | * | 5/2006 | Kirwan ............ A61B 17/00491 604/167.03 |

(Continued)

FOREIGN PATENT DOCUMENTS

GB        887482        11/1960

*Primary Examiner* — Abbas Rashid
(74) *Attorney, Agent, or Firm* — Karish & Bjorgum, PC

(57) ABSTRACT

A whisk includes a handle, a shaft and flexible wires. The handle has a cavity with a spiral internal track to engage and rotate the shaft with up and down motion of the handle. A collar is slidably mounted with a friction fit on the shaft. The flexible wires are coupled to the collar and to the second end of the shaft. Movement of the collar on the shaft changes the shape of the flexible wires. At the second end of the shaft, the flexible wires extend downwardly and then radially outwardly to lie in a plane and finally are bent toward the slidably mounted collar. A foot is rotatably mounted on the second end of the shaft and includes a bearing surface. The bearing surface extends from the second end of the shaft and beyond the defined plane within a clearance of coincidence with the defined plane.

4 Claims, 3 Drawing Sheets

(56) References Cited

U.S. PATENT DOCUMENTS

| | | | |
|---|---|---|---|
| 9,060,651 B2* | 6/2015 | Filipitsch et al. | |
| 2004/0236186 A1* | 11/2004 | Chu | 600/215 |
| 2009/0135668 A1* | 5/2009 | Hamilton | 366/343 |
| 2011/0037280 A1* | 2/2011 | Romero | 294/1.4 |
| 2011/0059216 A1* | 3/2011 | Takumah | 426/519 |
| 2015/0257603 A1 | 9/2015 | Lee et al. | |

* cited by examiner

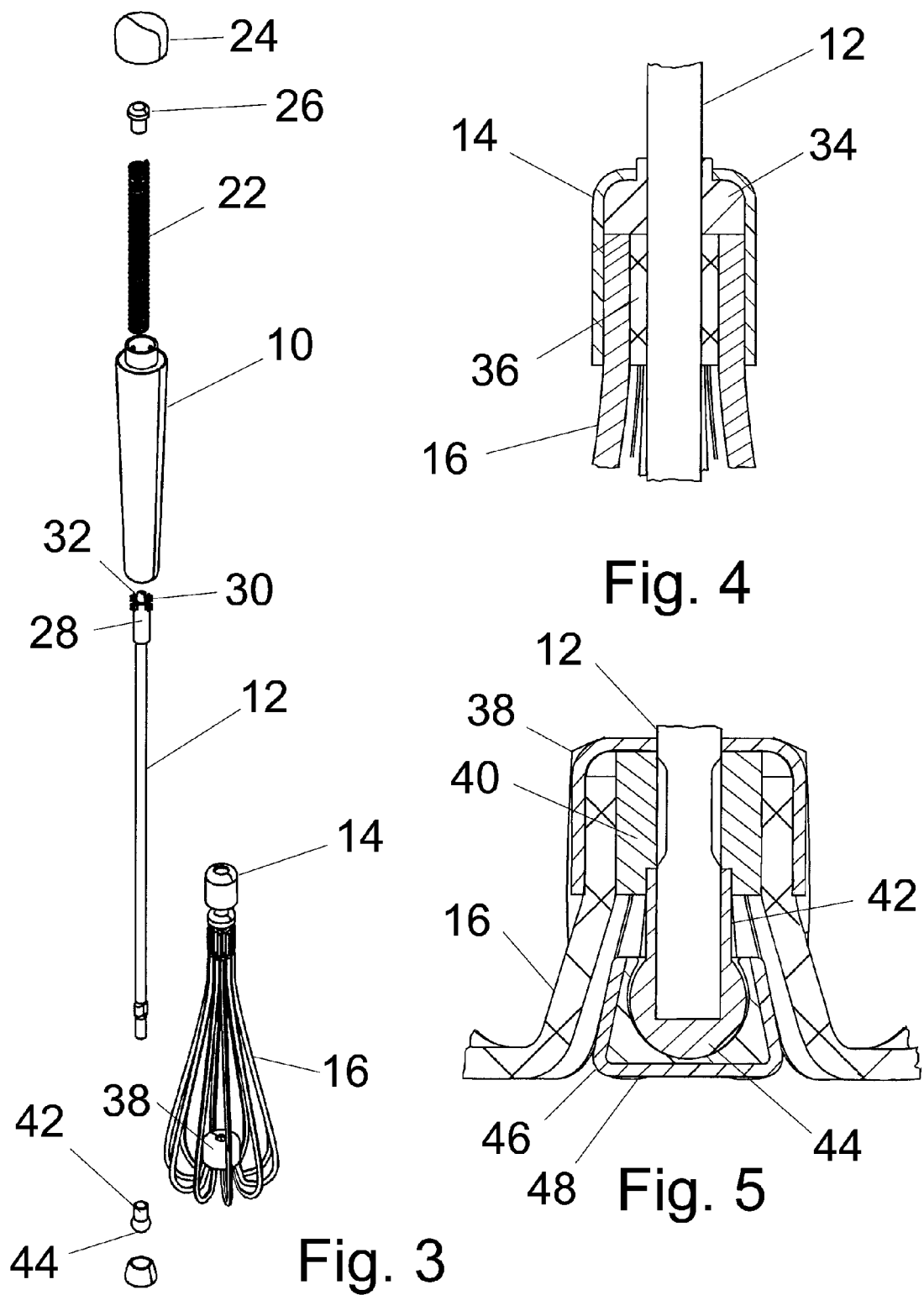

WHISK

BACKGROUND OF THE INVENTION

The field of the present invention is culinary whisks.

Typical French style culinary whisks include a handle with extended loops of wire emanating from one end of the handle and formed such that the loops extend principally in an elongated direction toward a distal end of the whisk. Such whisks are employed for making creams, sauces, scrambled eggs, dressings and emulsified oil/water mixtures.

A typical whisk is understood not to include mechanical devices. However, whisks having a shaft extending to the distal end of the loops are known which includes an interior spiral gear in a handle mounting a whisk shaft to drive the shaft rotationally as the handle is moved up and down relative to the shaft. A spring may bias the shaft longitudinally to a full extension of the shaft from the handle. Ball and socket devices at the distal end of the shaft can facilitate rotation of the whisk wire loops and prevent movement from the intended axis of rotation.

SUMMARY OF THE INVENTION

The present invention is directed to a culinary whisk having a handle, a shaft extending from the handle and flexible wires retained by the shaft at both ends of the wires.

In the first separate aspect of the present invention, a collar is slidably mounted with a friction fit on the shaft between the first and second ends of the shaft. The flexible wires are coupled to the collar and to the bottom of the shaft. The slidable collar allows the flexible wires to change collective shape.

In a second separate aspect of the present invention, the handle includes a cavity receiving the shaft. The shaft is able to move axially within the cavity and also rotationally therein. An elongate spiral track within the cavity engages with the guides of a follower on the shaft. Linear motion of the handle thus results in rotation of the shaft and whisk wires. The flexible wires extend from a collar mounted on the shaft to the distal end of the shaft. These flexible wires include segments extending radially outwardly to the shaft to lie in a plane below the second end of the shaft. A foot may be rotatably mounted on the second end of the shaft and extending to a bearing surface. The bearing surface extends a clearance distance below the defined plane of the wires. This allows the whisk to be actuated with the flexible wires located immediately adjacent to the bottom of a container within which the whisk is being used.

In a third separate aspect of the present invention, any of the foregoing aspects may be combined to greater effect.

Thus, it is a principal object of the present invention to provide an improved culinary whisk. Other and further objects and advantages will appear hereinafter.

BRIEF DESCRIPTION OF THE DRAWINGS

FIG. 3 is an exploded perspective view of the whisk.

FIG. 4 is a detailed cross-sectional view of the upper collar retaining the flexible wires.

FIG. 5 is a detailed cross-sectional view of the lower end of the shaft retaining the wire of the whisk and illustrating an associated foot.

DETAILED DESCRIPTION OF THE PREFERRED EMBODIMENT

Figure 1:
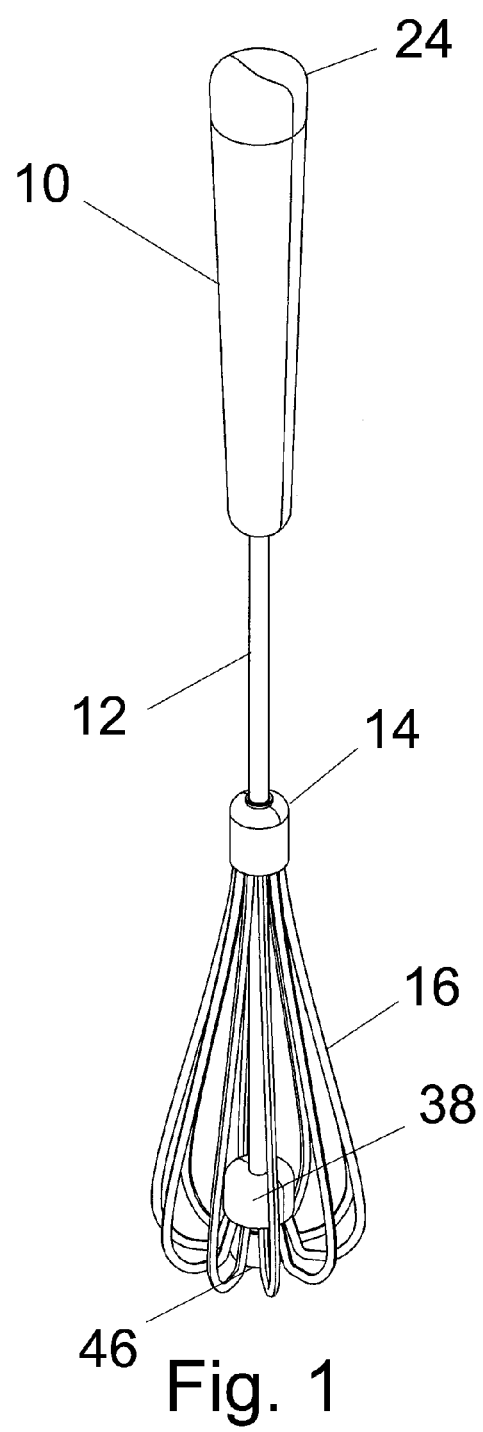
FIG. 1 is a perspective view of a whisk with all sides exhibiting the same appearance.
Figure 2:
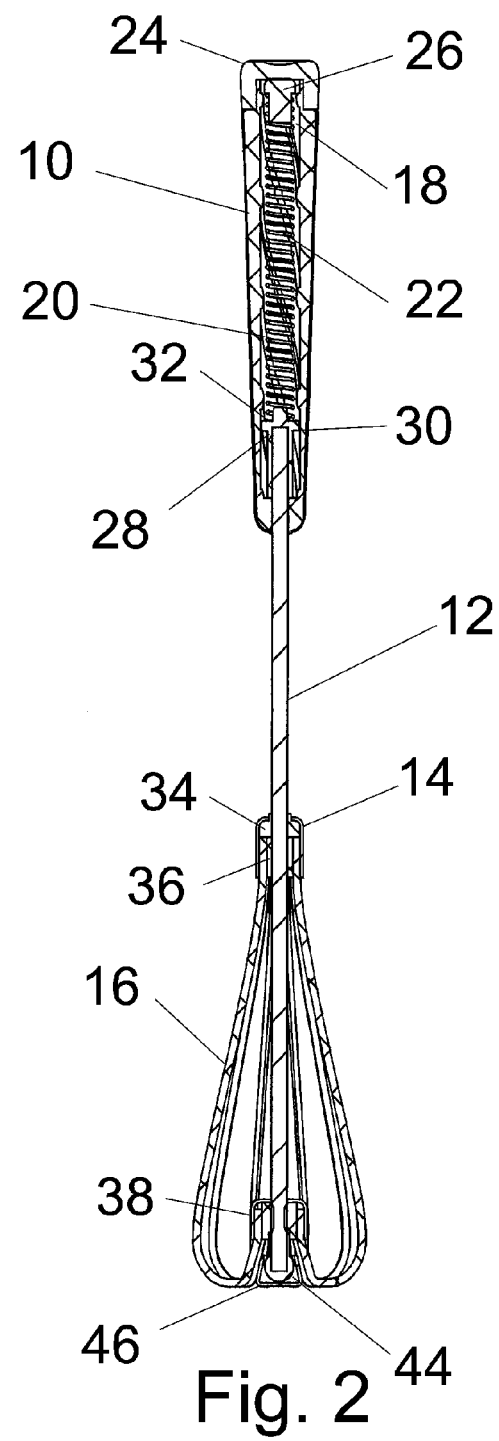
FIG. 2 is a vertical cross-sectional view taken through the center of the whisk.
Figure 6:
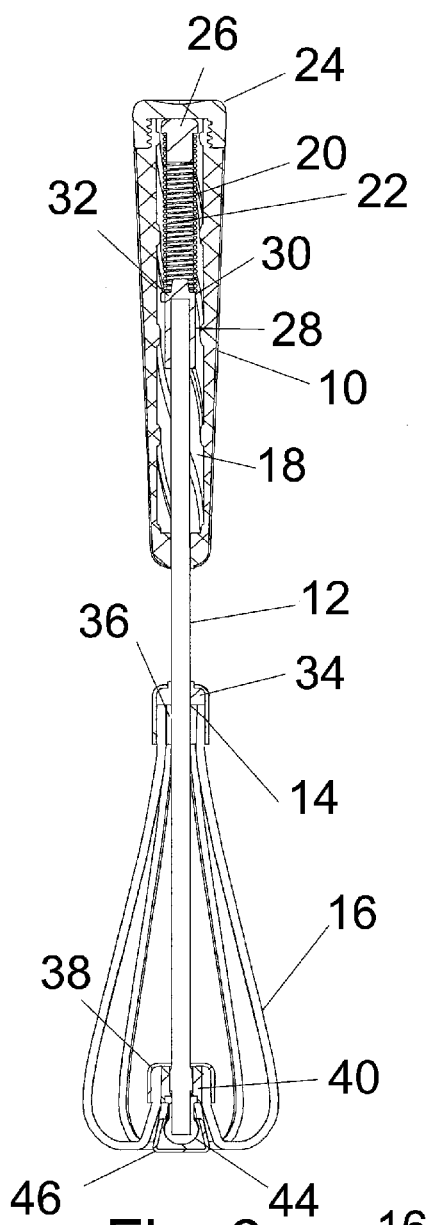
FIG. 6 is a cross-sectional view as in FIG. 2 with the shaft in a retracted position.
Figure 7:
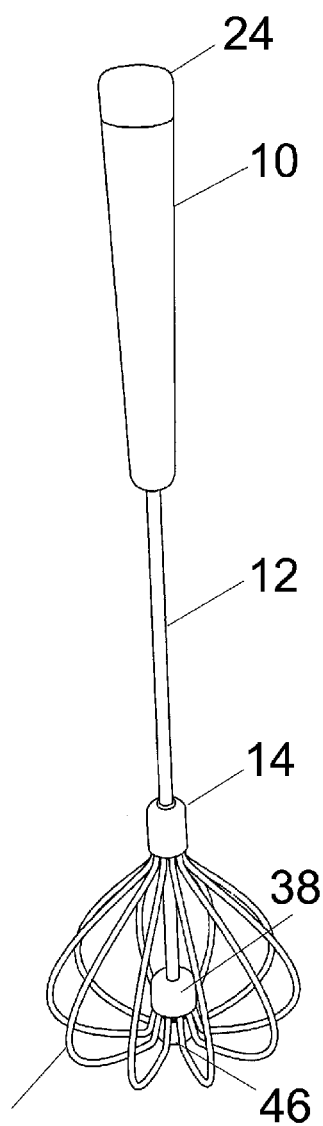
FIG. 7 is a perspective view of the whisk with the friction collar slid partially down on the shaft.
Figure 8:
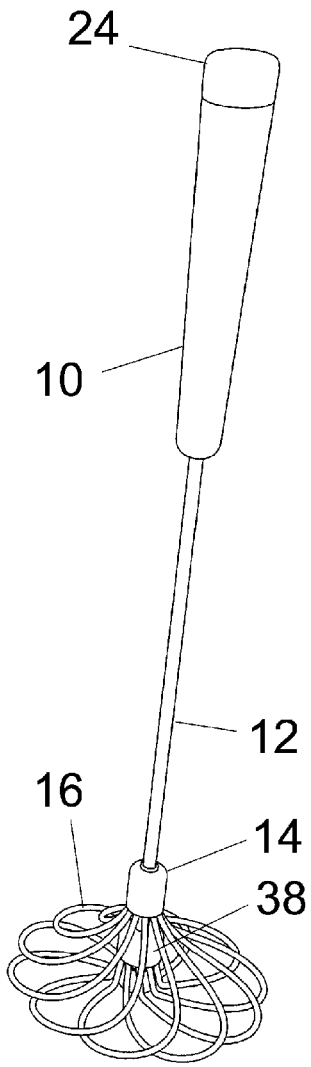
FIG. 8 is a perspective view of the whisk with the friction collar slid fully down on the shaft.

Turning in detail to the drawings, the whisk is illustrated in all of FIGS. 1 through 8. The whisk includes a handle 10, a shaft 12 mounted in the handle 10, a collar 14 on the shaft and flexible wires 16 extending from the collar 14 to the distal end of the shaft 12.

The handle 10 includes a cavity 18 with an internal spiral track 20. Preferably the spiral track 20 includes at least opposed spiral elements to facilitate operation of the handle 10 relative to the shaft 12. A spring 22 is positioned in the cavity 18. The cavity 18 is closed by a cap 24 and a spring retainer 26 having a shaft about which the spring extends. The cap 24 is threaded onto the handle 10. Reverse threads are used to retain the cap 24 so that thrusting down on the handle 10 will not have a tendency to unscrew the cap 24. That the cap 24 may be removed provides for washing the interior of the device.

The shaft 12 extends to within the cavity 18 and includes a follower 28 that is fixed to the upper end of the shaft 12. The follower 28 includes guide pins 30 and a shoulder 32. The guide pins 30 engage the spiral track 20 while the shoulder 32 receives the lower end of the spring 22. The fit between the cavity 18 of the handle 10 and the shaft 12 and follower 28 insures that the extension and rotation of the shaft 12 into and out of the cavity 18 is smooth without binding. The material of the follower 28 and the handle 10 may be polyoxymethylene.

The collar 14 is slideably mounted on the shaft 12. There is a friction fit provided by a plastic grommet 34 within the collar 14. One end of the flexible wires 16 also extends into the collar 14 where they are retained by an internal ferrule 36. The flexible wires 16 then extend from the collar 14 immediately toward the second end of the shaft 12.

At the distal end of the shaft 12, a further collar 38 is fixed to the shaft 12. The lower end of the flexible wires 16 are retained in the collar 38 and extend immediately downwardly away from the friction collar 14 above and are retained by an internal ferrule 40. A cap 42 is tightly positioned on the distal end of the shaft 12 and abuts against the internal ferrule 40 to retain the assembly together. The cap 42 includes a ball 44 on the end thereof.

The flexible wires 16 emanating from the lower collar 38 extend immediately downwardly away from the collar 38 and then extend radially outwardly to the shaft 12 to lie in a plane. Outwardly of the defined plane, the wires 16 are then bent toward the collar 14 where the upper ends of the wires 16 are retained.

At the lower end of the shaft 12, a foot 46 is rotatably mounted on the ball 44. The foot 46 may have a substantially cylindrical cavity of low friction material to receive the ball 44 for rotation relative thereto. The foot 46 also includes a bearing surface 48 which is located radially inwardly of the flexible wires 16 and extends from the second end of the shaft 12 to a position having a clearance distance beyond the plane radially outwardly of the shaft 12 defined by the flexible wires 16.

The near coincidence between the bearing surface 48 and the plane defined by the flexible wires 16 enables a close approach of the flexible wires 16 allowed by the bearing surface 48 of the foot 46 to the bottom of a container in which the whisk is being employed. Such a close approach can insure entrainment of all elements being mixed which may lie unwetted on the bottom of the container. At the same time, the flexible wires 16 can be offloaded or displaced from the container enough that drag on rotation and scaring of a nonstick container surface can be avoided with proper angular placement of the whisk relative to the container surface. The clearance may also accommodate a slight curvature common to the bottom of many containers. Alternatively, the defined plane of the flexible wires 16 may be slightly dished to accommodate the bottom of such containers as may be empirically determined.

Turning to the operation of the whisk, it may be employed as a conventional whisk without interactive mechanisms. Additionally, the whisk may be pushed against the container in which it is being employed and driven by linear action of the handle 10 to further advantage. The collar 14 slideably mounted on the shaft 12 may be forced against the friction fit into a continuous range of positions from that seen in FIG. 1 to that seen in FIGS. 7 and 8. In the latter configurations, greater mixing of contents located at the bottom of the mix being whisked is accomplished.

Thus, an improved whisk with multiple configurations and ability to mechanically rotate the whisk has been disclosed. While embodiments and applications of this invention have been shown and described, it would be apparent to those skilled in the art that many more modifications are possible without departing from the inventive concepts herein. The invention therefore is not to be restricted except in the spirit of the appended claims.

What is claimed is:

1. A whisk comprising
   a shaft including a first shaft end, a second shaft end and a follower, the follower being fixed to the first shaft end and having a shoulder and guides thereabout;
   a handle including a cavity receiving the first shaft end and a spring with a first end statically positioned in the cavity and a second end engaging the follower shoulder, the cavity including a spiral track engaged with the guides of the follower, the shaft being longitudinally and rotationally movable in the handle cavity;
   a collar retainable on the shaft between the first shaft end and the second shaft end at a range of locations therebetween;
   flexible wires, each having a first wire end and a second wire end, multiple of the flexible wires being separately coupled to the collar at the first wire end and to the second shaft end at the second wire end, the flexible wires extending from the collar immediately toward the second end of the shaft and extending radially outwardly in a plane perpendicular to the shaft adjacent the second end of the shaft, the flexible wires bending toward the collar outwardly from the defined plane.

2. The whisk of claim 1 further comprising
   a foot rotatably mounted on the second shaft end and including a bearing surface, the bearing surface being inwardly of the flexible wires extending from the second end of the shaft and beyond the defined plane within a clearance of coincidence with the defined plane.

3. The whisk of claim 2 further comprising
   a ball and socket coupling between the foot and the second end of the shaft.

4. A whisk comprising
   a shaft including a first shaft end, a second shaft end and a follower, the follower being fixed to the first shaft end and having a shoulder and guides thereabout;
   a handle including a cavity receiving the first shaft end and a spring with a first end statically positioned in the cavity and a second end engaging the follower shoulder, the cavity including a spiral track engaged with the guides of the follower, the shaft being longitudinally and rotationally movable in the handle cavity;
   a collar retainable on the shaft between the first shaft end and the second shaft end at a range of locations therebetween;
   flexible wires, each having a first wire end and a second wire end, multiple of the flexible wires being separately coupled to the collar at the first wire end and to the second shaft end at the second wire end, the flexible wires extending from the collar immediately toward the second end of the shaft and extending radially outwardly in a plane perpendicular to the shaft adjacent the second end of the shaft, the flexible wires bending toward the collar outwardly from the defined plane;
   a foot rotatably mounted on the second shaft end and including a bearing surface, the bearing surface being inwardly of the flexible wires extending from the second end of the shaft and beyond the defined plane within a clearance of coincidence with the defined plane.

* * * * *